United States Patent Office.

GEORGE SATTLER, SR., AND CARL NAGEL, OF ST. LOUIS, MISSOURI, ASSIGNORS OF ONE-HALF TO GEORGE SATTLER, JR., OF EAST ST. LOUIS, ILLINOIS.

PROCESS OF MAKING BRICK.

SPECIFICATION forming part of Letters Patent No. 395,590, dated January 1, 1889.

Application filed February 16, 1888. Serial No. 264,278. (No specimens.)

*To all whom it may concern:*

Be it known that we, GEORGE SATTLER, Sr., and CARL NAGEL, both of the city of St. Louis, in the State of Missouri, have invented a certain new and useful Improvement in Methods of Making Paving Bricks, Blocks, &c., of which the following is a full, clear, and exact description.

Fire-clays, especially those of the more tenacious kinds, shrink greatly and are certain to crack in drying. To obviate this manufacturers have added to the raw clay about one-third of thoroughly-burnt clay of the same kind in a powdered state.

Bricks so made are not homogeneous in character and require to have their particles fused together by intense heat, in order to become hard. The percentage of loss in this case is very great. In our method the whole of the clay which is used to form the brick is first reduced to powder and then heated to a cherry-red heat. After cooling, it is mixed with water to a proper consistence and molded in the usual or any suitable way. The subsequent treatment of the bricks or blocks is as usual—that is, they are dried and then burned in the usual way in an ordinary kiln.

The clay, when treated as above, does not lose its tenacity or cohesive property and dries without cracking either in sun or shade. It stands up better in the kiln and burns more uniformly, as it is perfectly homogeneous. The brick or block has greater durability in every place where it is subjected to severe wear or strain than bricks made in any other way as far as known. Bricks made in accordance with our method need not be fused or subjected to a very high degree of heat in the final burning, and consequently the bricks retain a perfect form, and, owing to their homogeneous condition, do not crack, so that there is scarcely any loss from cracking or distortion in manufacture.

We claim as our invention—

The described method or process of making bricks, blocks, &c.—namely, by powdering the clay, heating it uniformly to a cherry-red heat, cooling, mixing it with sufficient water for molding, and then molding, drying, and burning, as usual.

GEORGE SATTLER, SR.
CARL NAGEL.

In presence of—
SAML. KNIGHT,
EDWD. S. KNIGHT.